United States Patent
Barratt et al.

(10) Patent No.: US 7,907,960 B1
(45) Date of Patent: Mar. 15, 2011

(54) METHOD AND APPARATUS FOR ADJUSTING FEEDBACK OF A REMOTE UNIT

(75) Inventors: Craig H. Barratt, Redwood City, CA (US); David M. Parish, Amherst, NY (US); Stephen J. Sifferman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1127 days.

(21) Appl. No.: 11/361,440

(22) Filed: Feb. 24, 2006

Related U.S. Application Data

(62) Division of application No. 09/967,858, filed on Sep. 28, 2001, now Pat. No. 7,024,163.

(51) Int. Cl.
*H04B 7/00* (2006.01)

(52) U.S. Cl. .......... 455/522; 455/69; 455/273; 455/275; 455/276.1

(58) Field of Classification Search .................... 455/69, 455/522, 273, 275, 276.1, 277.2, 278.1
See application file for complete search history.

(56) References Cited

U.S. PATENT DOCUMENTS

| 6,021,317 | A | 2/2000 | Irvin |
| 6,144,861 | A * | 11/2000 | Sundelin et al. ............... 455/522 |
| 6,285,861 | B1 | 9/2001 | Bonaccorso et al. |
| 6,351,499 | B1 | 2/2002 | Paulraj et al. |
| 6,473,601 | B1 | 10/2002 | Oda |
| 6,549,785 | B1 | 4/2003 | Agin |
| 6,678,253 | B1 | 1/2004 | Heath, Jr. et al. |
| 7,006,848 | B2 * | 2/2006 | Ling et al. .................. 455/562.1 |

FOREIGN PATENT DOCUMENTS

WO    WO 97/24818    12/1996

* cited by examiner

*Primary Examiner* — Kent Chang
*Assistant Examiner* — Dung Lam
(74) *Attorney, Agent, or Firm* — Blakely, Sokoloff, Taylor & Zafman LLP

(57) ABSTRACT

Methods and apparatus implementing spatial processing in a remote unit. In general, in one aspect, the present invention provides a remote unit, that includes a plurality of antennas and a spatial processing unit coupled to the plurality of antennas. The remote unit also includes a performance determination unit to determine a performance of the remote unit and a feedback adjustment unit to adjust feedback transmitted from the remote unit to a device, wherein the adjusted feedback accounts for performance associated with the spatial processing unit.

15 Claims, 8 Drawing Sheets

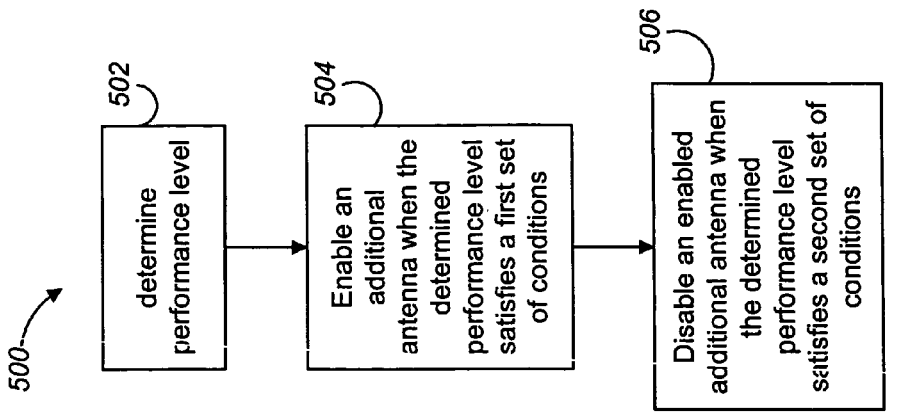
FIG. 5
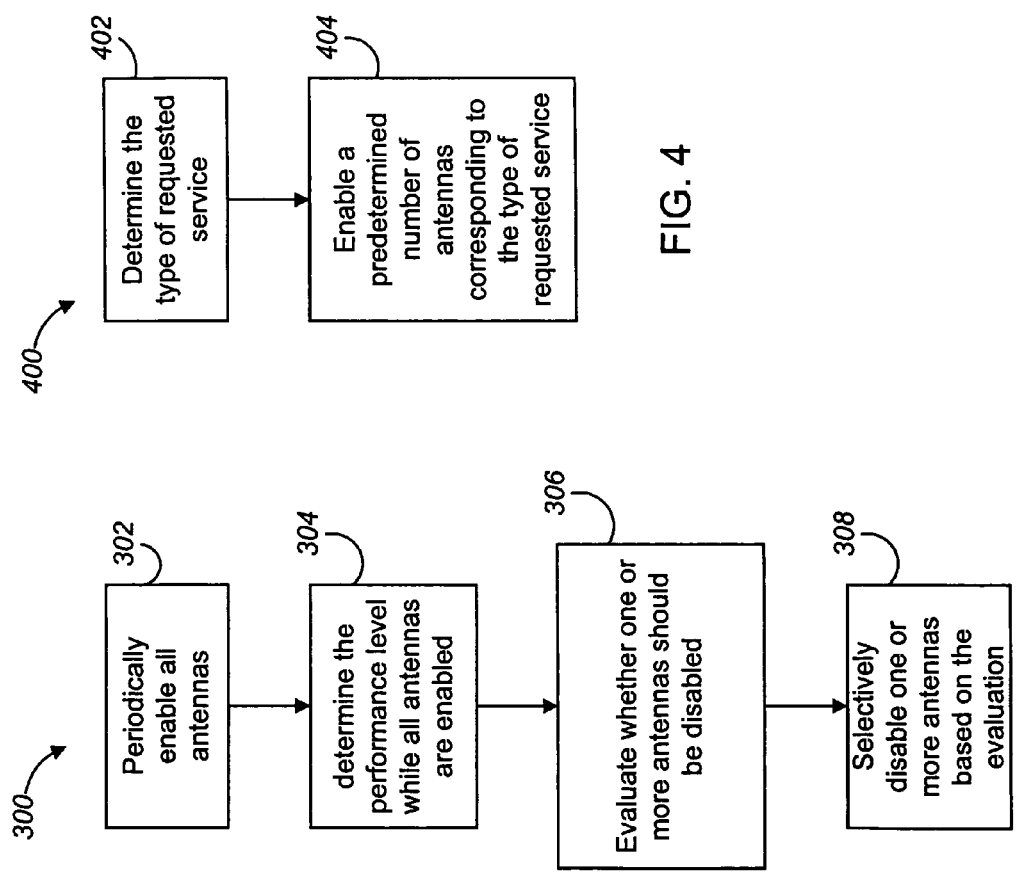
FIG. 4
FIG. 3

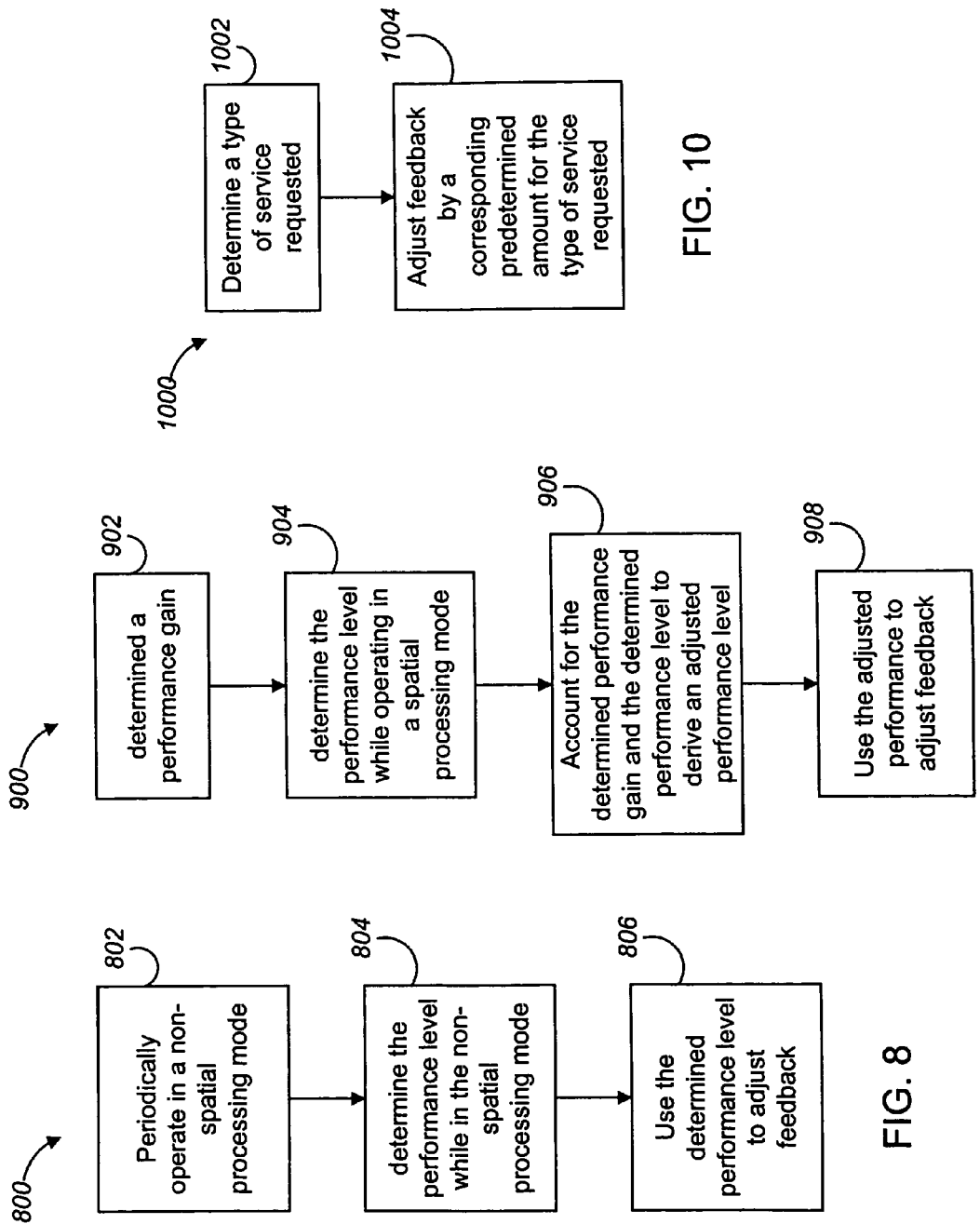

METHOD AND APPARATUS FOR ADJUSTING FEEDBACK OF A REMOTE UNIT

RELATED APPLICATIONS

The present patent application is a Divisional of application Ser. No. 09/967,858, filed Sep. 28, 2001, now U.S. Pat. No. 7,024,163 entitled "A Method and Apparatus for Adjusting Feedback of a Remote Unit".

BACKGROUND OF THE INVENTION

The present invention relates to wireless communication systems.

Generally, wireless communication systems include multiple base stations in different geographic areas. Each base station provides services for remote units within the base station's geographic area.

Base stations and remote units are distinguishable. Generally, remote units include termination devices in a wireless communication system. In contrast, a base station is not a termination device. Rather, a base station usually relays traffic between or among termination devices. Another distinguishing feature between a base station and a remote unit is that a base station can simultaneously communicate with multiple remote units while a remote unit usually communicates with only one base station (except in certain situations such as handover).

Remote units include cellular phones. Although cellular telephones were initially limited to bulky systems installed in automobiles, they have developed into more compact, portable, and multi-functional voice and data-capable communication devices. Remote units also include other types of stationary and mobile wireless communication devices, any of which may provide wireless communication and processing of any combination of voice and data signals using any combination of analog and digital techniques. Such devices include, but are not limited to, cellular-type voice and data handsets, wireless modems (e.g., PCMCIA) for portable or fixed computing systems, wireless personal digital assistants, wireless two-way pagers, and wireless Web pads.

Remote units are operable in various types of wireless communication system architectures and protocols, including but not limited to cellular systems (e.g., AMPS, CDMA, GSM, and PHS), wireless local area network ("WLAN"), microwave point-to-multipoint systems, and so forth. Remote units typically provide various types of voice and/or data communication functionalities (also referred to as requested services) that may be enabled by hardware, software, or any combination thereof.

To facilitate processing and communication of voice and data signals, remote units may include a display, a numeric or alphanumeric keypad, pointing device, speaker and/or microphone, digital video/photo camera, data storage, Web browsing capability, instant/text messaging capability, and a graphical user interface.

Some remote units, such as cellular phones, are mobile. Usually, mobile remote units are designed to be relatively small in size in order to facilitate portability. Such remote units typically have a relatively small antenna and power source, such as a small rechargeable battery having a limited power capacity. As a result, remote units may be more susceptible to interference and other types of transmission (Tx) and/or reception (Rx) performance degradation and may suffer from limited power resources. Generally, the performance level of a remote unit indicates how well the remote unit is communicating with other devices. In most wireless communication systems, performance is measured by some probability of error, Pe, in signal processing. Examples of a probability of error include bit error rate ("BER") and frame error rate ("FER"). Other indicia of performance include metrics of signal quality, such as a signal to noise ratio ("SNR") or a signal to interference and noise ratio ("SINR"), and receive signal strength indication ("RSSI").

SUMMARY OF THE INVENTION

The present invention provides methods and apparatus, including computer program products, for adjusting feedback in a remote unit.

In general, in one aspect, the present invention provides a remote unit, that includes a plurality of antennas and a spatial processing unit coupled to the plurality of antennas. The remote unit also includes a performance determination unit to determine a performance of the remote unit and a feedback adjustment unit to adjust feedback transmitted from the remote unit to a device, wherein the adjusted feedback accounts for performance associated with the spatial processing unit.

BRIEF DESCRIPTION OF THE DRAWINGS

FIG. 3 shows a flow diagram of a method for conserving power in a remote unit, in accordance with one embodiment of the invention.

FIG. 4 shows a flow diagram of a method for conserving power in a remote unit, in accordance with one embodiment of the invention.

FIG. 5 shows a flow diagram of a method for conserving power in a remote unit, in accordance with one embodiment of the invention.

FIG. 8 shows a flow diagram of a method for adjusting feedback to allow a remote unit to benefit from spatial processing gains, in accordance with one embodiment of the invention.

FIG. 9 shows a flow diagram of a method for adjusting feedback to allow a remote unit to benefit from spatial processing gains, in accordance with one embodiment of the invention.

FIG. 10 shows a flow diagram of a method for adjusting feedback to allow a remote unit to benefit from spatial processing gains, in accordance with one embodiment of the invention. Like reference symbols in the various drawings indicate like elements.

DETAILED DESCRIPTION

Overview

Figure 1:
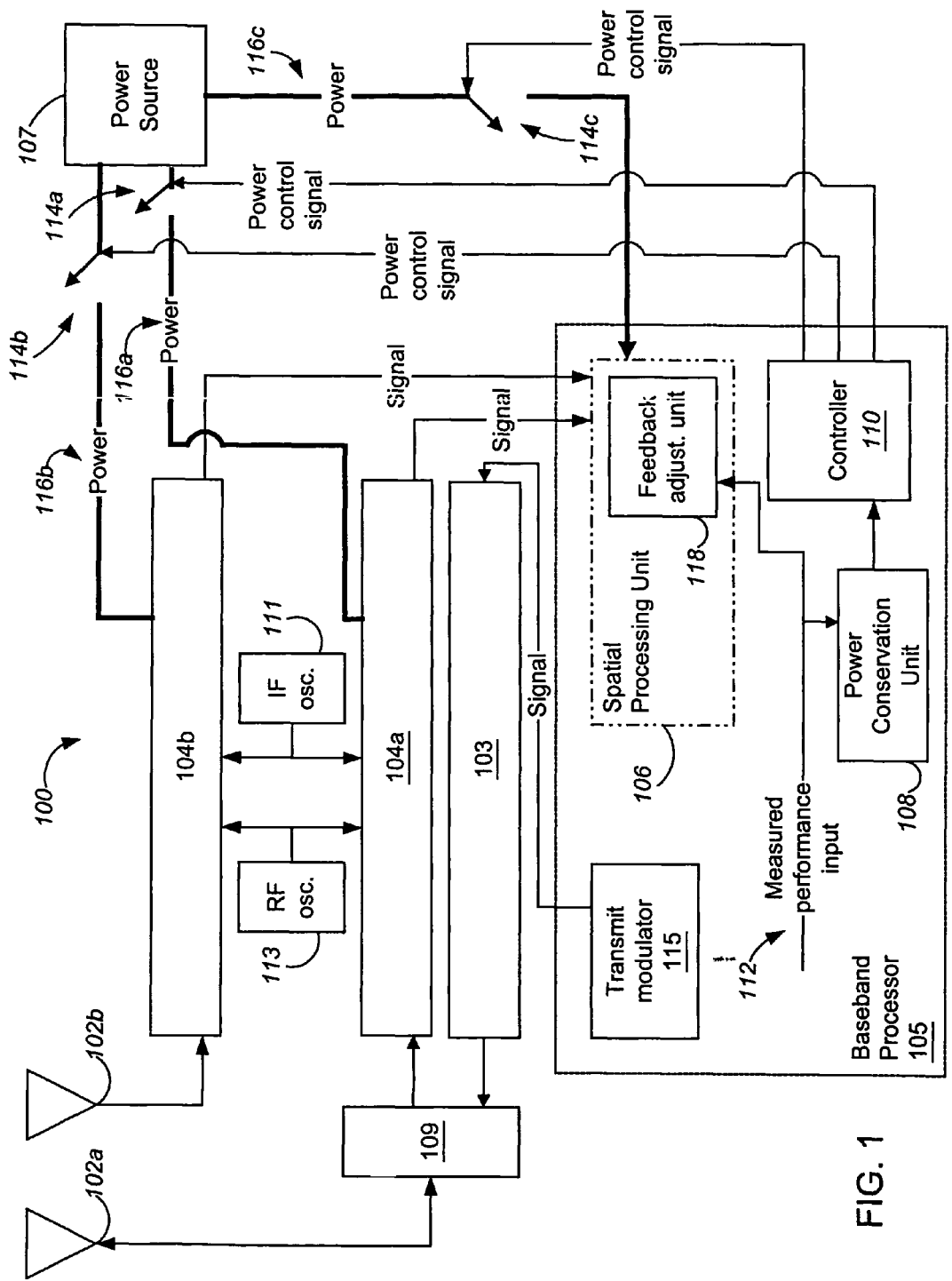
FIG. 1 shows a remote unit in accordance with the invention.

A remote unit in accordance with the invention includes an antenna array, corresponding receive paths, and a spatial processing unit. The spatial processing unit advantageously improves the performance of the remote unit. For example, during downlink, the onboard spatial processing unit improves received signal quality.

In accordance with one inventive aspect, the remote unit further includes a power conservation unit for determining when the remote unit should perform spatial processing. For instance, in one embodiment, the power conservation unit determines the number of antennas that should be used and/or the number of receive paths to be enabled during spatial processing operations, in each case considering factors such as performance level and power conservation. The power conservation unit advantageously improves power efficiency of the remote unit.

For example, in one embodiment of the invention, during spatial processing operations and when a performance level of the remote unit satisfies certain criteria, the remote unit disables one or more receive paths, thereby conserving power and hence battery life. When the performance level satisfies other criteria, the remote unit enables one or more additional receive paths. Criteria for disabling an enabled receive path include having a performance level that exceeds a predetermined quality of service. Criteria for enabling an additional receive path include having a performance level that is below the predetermined quality of service. By determining performance level and adjusting the number of receive paths that are enabled, the remote unit is power efficient during spatial processing operations and, consequently, does not impractically drain its battery.

In accordance with another inventive aspect, the remote unit also includes a feedback adjustment unit for adjusting feedback to a base station that may adjust operating parameters, such as and not limited to data transfer rate, channel assignment, handover, and/or transmit power, in response to feedback from remote units. In one embodiment, feedback adjustment depends on whether the base station's response to a reported performance gain by the remote unit adversely or beneficially affects the remote unit.

Specifically, when the remote unit is communicating with a base station whose response to a reported performance gain adversely affects the remote unit, the feedback adjustment unit adjusts feedback so that the base station does not adjust operating parameters in response to any performance gained from the spatial processing operations and therefore degrade the remote unit's performance. Consequently, the remote unit is advantageously able to benefit from any resultant performance gain. In one embodiment, the spatial processing operations can be enabled by a user, by a base station or other device, or automatically by the remote unit itself to increase the remote unit's performance level, for example, when transmitting or receiving signals of high interest, such as signals for an important fax or an important conversation. By increasing the remote unit's performance level and having the downlink base station maintain operating parameters, the probability of dropping an important communication can be reduced.

On the other hand, when the remote unit is communicating with a base station whose response to a reported performance gain benefits the remote unit, the feedback adjustment unit adjusts feedback so that the base station does adjust operating parameters in response to any performance gained from the spatial processing operations and therefore enhance the remote unit's performance. Consequently, the remote unit is advantageously able to benefit from the performance gained from spatial processing.

One Embodiment of a Remote Unit in Accordance with the Invention

As shown in FIG. 1, a remote unit 100 in accordance with the invention includes an antenna array having antennas 102a and 102b, a transmit path 103, receive paths 104a and 104b, a baseband processor 105, a power source 107 (such as a small rechargeable battery), and a duplexer 109. The receives paths 104a and 104b share a local IF oscillator 111 and a local RF oscillator 113. Each of the transmit path 103 and receive paths 104a and 104b includes signal processing devices that prepare signals for processing in baseband processor 105 or for transmission out antenna 102a. The paths are further described below with reference to FIGS. 2A and 2B. The baseband processor 105 includes a transmit modulator 115 that produces signals to be forwarded to transmit path 103, duplexer 109, and antenna 102a. Although the remote unit 100 shown includes only two antennas, three or more antennas and associated receive paths can be provided.

Figure 1A:
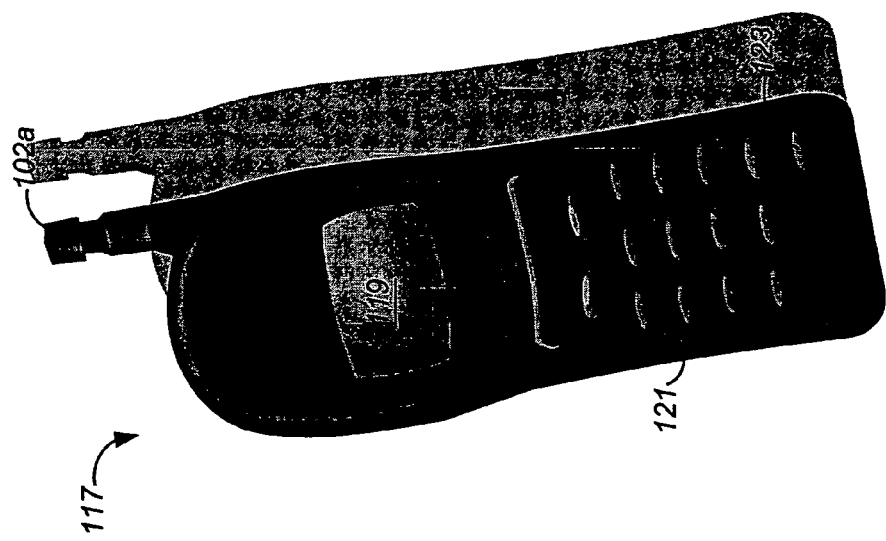
FIG. 1A shows a remote unit that is a mobile phone.

FIG. 1A shows a remote unit that is a mobile phone handset 117, in accordance with one embodiment of the invention. The mobile phone handset 117 includes a graphical user interface such as display 119 for interaction with a user. The mobile phone handset 117 also includes an alpha numeric keypad 121 for receiving input. The keypad 121 includes a button 123 for enabling and disabling spatial processing. Alternatively, the display 119 provides a menu or an icon for enabling and disabling spatial processing. The mobile phone includes antenna 102a and 102b, the latter of which is not depicted for clarity. In one embodiment, the antenna 102b is internal to the mobile phone handset 117. In other embodiments, the antenna 102b can be external and have similar or different characteristics as antenna 102a. A remote unit in accordance with the present invention may include two or more antennas, any one or combination of which may be internal and/or external. FIG. 1A shows but one embodiment of a remote unit, various other embodiments of cellular-type voice and data handsets as well as other embodiments of a remote unit are possible. Other embodiments of a remote unit include but are not limited to wireless modems (e.g., PCM-CIA) for portable or fixed computing systems, wireless personal digital assistants, wireless two-way pagers, and wireless Web pads.

Spatial Processing

Baseband processor 105 (FIG. 1) also includes spatial processing unit 106 that processes signals received through antennas 102a and 102b. Generally, spatial processing unit 106 takes advantage of the physical separation between the antennas 102a and 102b, which separation provides uncorrelated diversity branches. Diversity branches can be provided through physical diversity, including not but not limited to having physically separate antennas, using antennas of different shapes or materials, or any combination thereof. Alternatively, the remote unit 100 employs other techniques for constructing diversity branches of a received signal. These techniques include but are not limited to angle diversity (also known as direction diversity) and polarization diversity. Angle diversity uses multiple directional antennas. Each antenna responds independently to a radio wave propagating at a certain angle and thus receives a diversity branch of the wave that is not correlated with the other branches received at the other antennas. In polarization diversity, two antennas are situated such that they have different polarization to provide two diversity branches. Any one or combination of diversity techniques, such as those described above, may be employed in various embodiments of the invention.

Spatial processing unit 106 combines or selects the diversity branches to improve performance of the remote unit 100. Methods for combining or selecting diversity branches include but are not limited to maximal-ratio combining, equal-gain combining, and selection, any of which can be used by the spatial processing unit 106.

Figure 1B:
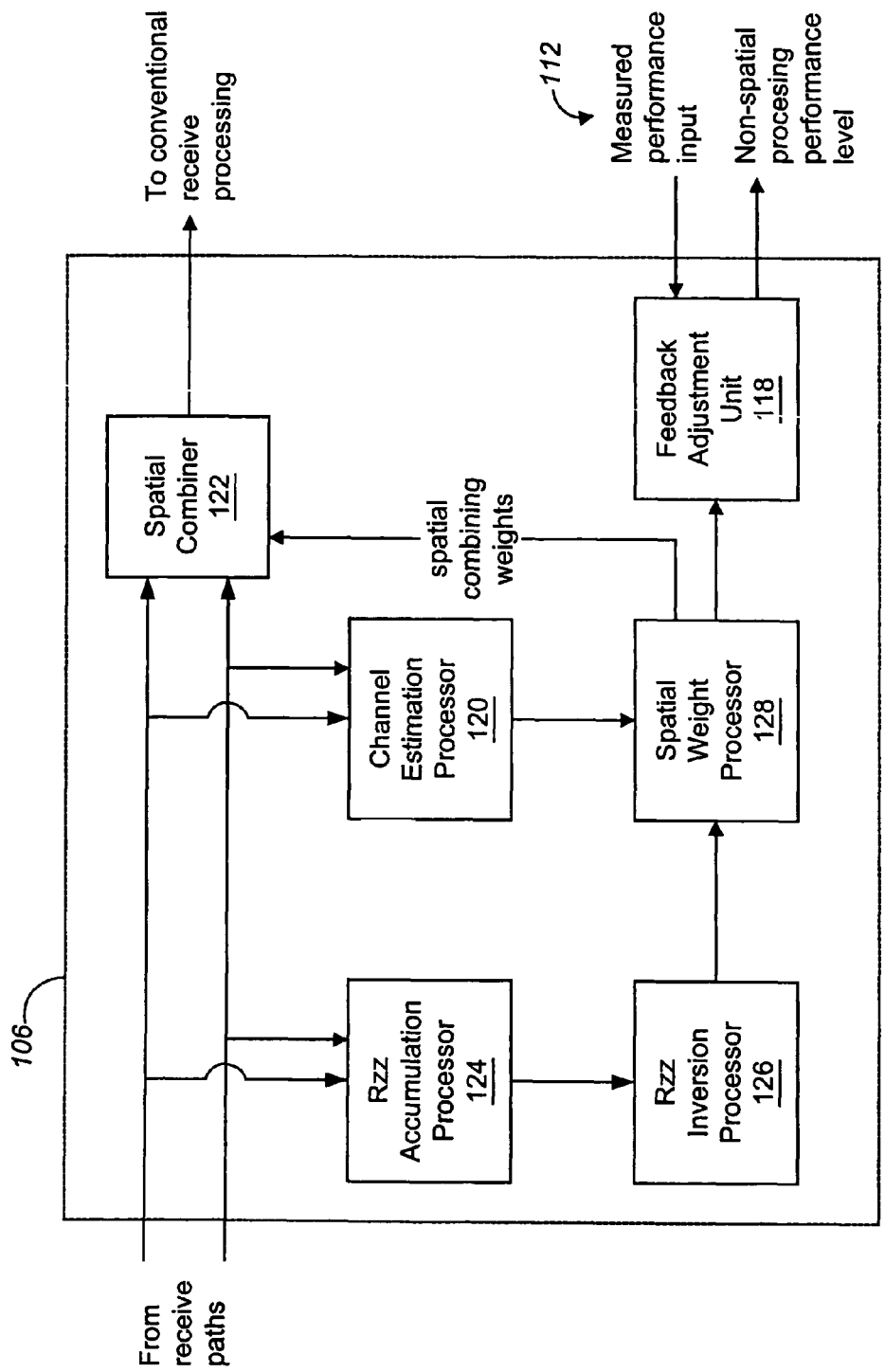
FIG. 1B shows a more detailed view of the spatial processing unit of FIG. 1.

FIG. 1B shows one embodiment of spatial processing unit 106. A channel estimation processor 120 calculates a channel estimate for each of the received antenna signals by convolving the received signal with a known pilot or training sequence. For example, in a GSM system, the middle portion of each burst contains a known 26 bit training sequence. Similarly in CDMA, a known pilot signal is contained in the received signal. The channel estimate contains information about the relative power, timing, and phase of the multipath copies of a given signal and is calculated separately for each antenna. Typically, this channel estimate is updated frequently because the channel changes as the user and environment move. In one embodiment, the channel estimate is updated at the frame or burst rate in the system. Alternatively, the channel estimate is updated at a regular rate, for example every ten (10) milliseconds.

In maximal gain combining, spatial processing unit 100 acts to combine the signal from each of the antennas while first weighting or multiplying the signal with a factor that is proportional to the power of the signal as determined by the channel estimate. Weighting and combining is executed in a spatial combiner 122. The weighting factor can be complex and include a phase rotation that rotates the phase of each of the antenna signals so that the signals are in phase when they are combined. Maximal gain combining serves to maximize the signal to noise ratio of the combined signal. Embodiments of the invention are not restricted to using the described maximum gain combining technique. Any one or combination of combining or selection techniques can be used to combine or select diversity branches.

In a specific example, the channel estimate for a two antenna remote might be:
Antenna 1: 0.8 at angle 50 degrees
Antenna 2: 0.5 at angle −85 degrees.
Or more concisely ChanEst=(0.51+0.61 j, 0.04-0.49j)
The "maximal gain combining weight" for this example would then be
W1=0.8 at −50 degrees
W2=0.5 at −85 degrees
If S1 is the received signal from antenna 1, and S2 is the received signal from antenna 2, the combined signal SC computed by the spatial combiner would then be: SC=W1*S1+W2*S2. This combined signal, SC, would then be passed to the conventional receiver processing for the system for demodulation.

In one embodiment, one type of spatial processing technique such as Minimum Mean Squared Error ("MMSE"), is used to not only improve the signal to noise ratio of the combined signal, but also to improve the carrier to interference ratio of the combined signal in the presence of a strong interfering signal, such as a signal from a neighboring base station. In this method, a covariance matrix, Rzz, is formed by a Rzz accumulation processor 124 from the received signals in addition to the channel estimate. For a two-antenna remote unit, $$Rzz = S1*S1', S1*S2'S2*S1', S2*S2'$$

The inverse of the covariance matrix is computed by a Rzz inversion processor 126. The weight vector is then calculated by a spatial weight processor 128. The spatial weight processor 128 then multiplies the channel estimate by the inverse of the covariance matrix.

$$(W1, W2) = inv(Rzz)*ChanEst$$

The combined signal is then formed by the spatial combiner 122:

$$SC = W1*S1 + W2*S2$$

This weight vector is used by the spatial combiner 122 to produce a combined signal that has a maximum carrier to interference ratio given the two antenna signals. In the current embodiment, the covariance matrix and the weight vector are updated every time the channel estimate is updated, namely, at the frame or burst rate in the system or otherwise every 10 msecs. The spatial weight processor 128 also produces a signal quality improvement estimate, based on the quality of the known training or pilot data in the received signals, that is supplied to the feedback adjustment unit 118.

The described mathematical techniques can be employed to form substantially the same MMSE solution without requiring the inversion of Rzz. The invention may employ a combination of various spatial processing techniques, including but not limited to MMSE. Some spatial processing techniques are described in U.S. application Ser. No. 09/727,261 filed on Nov. 30, 2000, which is hereby incorporated by reference in its entirety, and also in U.S. Pat. No. 6,275,453 issued on Aug. 14, 2001, which is also hereby incorporated by reference in its entirety.

Referring again to FIG. 1, the remote unit 100 optionally includes a user input (not shown) for manually enabling and disabling spatial processing. In one embodiment, the input may be a mechanical button such as button 123 shown in FIG. 1A. Actuation of the mechanical button causes the switch 114c to open, cutting power to the spatial processing unit. Alternatively, the user input is an on-screen button. The user input can also be a voice activated command that causes the switch 114c to open. Furthermore, instead of or in combination with disabling power to the spatial processing unit and/or a receive path, the user input can send signals to the spatial processing unit 106 directing the spatial processing unit 106 to stop or start spatial processing.

Power Conservation

Baseband processor 105 also includes a power conservation unit 108 that includes power conservation logic for determining a number of receive paths to be enabled for spatial processing operations, considering factors such as performance level and power consumption. The number of receive paths enabled can be the number of receive paths that provide the best performance gain to power consumption ratio. The power conservation logic includes logic for determining, during spatial processing operations, when to enable and when to disable a receive path.

The power conservation unit 108 receives as input determined performance levels. The determined performance level can include one or any combination of various indications of performance. Such indications can be based on, for example, measurement, estimation, averaging, etc., of performance. In one embodiment, the power conservation unit 108 receives measures of performances 112 (i.e., the "measured performance input") that indicate the actual performance level of the remote unit 100. In one embodiment, the measured performance input 112 includes but is not limited to one or a combination of the following: measures of error in signal processing, such as FER and BER, and measures of signal quality, such as SINR, SNR, and RSSI.

In one embodiment, the power conservation unit 108 enables at least the number of receive paths to satisfy a predetermined quality of service such as that imposed by a particular wireless system's operating parameters, system architecture, or standard. The operation of the power conservation unit 108 and the power conservation logic is described below with reference to FIGS. 3-7.

As shown in FIG. 1, baseband processor 105 further includes a controller 110 that enables and disables receive paths 104*a* and 104*b* based on input provided by the power conservation unit 108. Controller 110 receives input from the power conservation unit 108, including signals instructing the controller 110 to enable an additional receive path and signals instructing the controller 110 to disable an enabled receive path. In response to these inputs, controller 110 outputs power control signals to open and shut switches 114*a* and 114*b* in the power lines 116*a* and 116*b* to receive paths 104*a* and 104*b*, respectively. During spatial processing operations, power conservation unit 108 and controller 110 operate in conjunction to dynamically and selectively adjust, in response to changes in the determined performance level, the number of receive paths that are enabled, and/or the complexity of spatial processing technique employed, or if spatial processing is employed at all.

Optionally, in addition to determining the number of receive paths to be enabled during spatial processing operations, the power conservation unit also determines when the remote unit 100 should perform spatial processing, considering similar factors involved in determining the number of receive paths to be enabled during spatial processing operations. When the power conservation unit 108 has determined that the remote unit 100 should not perform spatial processing, power conservation unit 108 sends instructions to the controller 110 to open switch 114*c* in power supply line 116*c*, reducing power delivery to or processing speed/complexity of the spatial processing unit 106. Alternatively, instead of disabling or reducing power to the spatial processing unit 106, the power conservation unit sends instructions to the spatial processing unit 106 to cease spatial processing. (The electrical connection for communication between the power conservation unit and the spatial processing unit is not shown.)

Feedback Adjustment

In one embodiment of the invention, the spatial processing unit 106 includes a feedback adjustment unit 118 for adjusting feedback when communicating with a base station. Although the feedback adjustment unit 118 shown is part of the spatial processing unit 106, such a configuration is not required. As discussed, this inventive feature may be employed where a base station uses feedback from remote units to adjust operating parameters such as data transfer rate, downlink power control, channel assignment, or others in response to such feedback. In one embodiment, the feedback adjustment depends on whether the bases station's response to a reported spatial processing gain by the remote unit is adverse or beneficial to the remote unit.

When the base station's response adversely affects the remote unit, the feedback adjustment unit, in one embodiment, adjusts feedback so that the base station does not adjust operating parameters. For example, a base station can adjust its transmit power in response to reports of performance from the remote units operating in the base station's geographic area. These reports (i.e., the feedback) indicate the remote unit's current performance level. When a remote unit reports a low performance level, the base station typically increases its transmit power to maintain a predetermined quality of service. When a remote unit reports a high performance level, the base station typically lowers its transmit power while maintaining the predetermined quality of service. Accordingly, any gain attributable to spatial processing in a remote unit as proposed herein may not be realized by the remote unit in net effect.

Feedback adjustment unit 118 solves this problem by adjusting feedback so that a base station that includes a feedback mechanism will not "see" the performance gain realized through the use of spatial processing in a remote unit. The feedback adjustment unit 118 includes feedback adjustment logic for determining a performance level for non-spatial processing operations and logic for adjusting, in view of the determined performance level, the feedback the remote unit 100 transmits to a base station. In one embodiment, the feedback adjustment unit 118 uses received measured input 112 to determine a non-spatial processing performance level of the remote unit 100.

As discussed, the determined performance level can include one or any combination of various indications of performance. Such indications can be based on, for example, measurement, estimation, averaging, etc., of performance. In one embodiment, the measured performance input 112 includes but is not limited to one or a combination of the following: measures of error in signal processing, such as FER and BER, and measures of signal quality, such as SINR, SNR, and RSSI. In another embodiment, measured performance input 112 indicates the actual performance level of the remote unit 100. For example, during spatial processing operations, measured performance input 112 indicates the actual performance level accounting for any gain from spatial processing. In contrast, the estimated performance level provided as an output by feedback adjustment unit 118 indicates either actual performance level or some other adjusted performance level. For example, the estimated performance level can be adjusted to indicate a non-spatial processing performance level even when the remote unit 100 is operating in a spatial processing mode. Consequently, the gain from spatial processing unit 106 is not apparent to a base station communicating with remote unit 100. As such, the base station does not adjust its operating parameters, e.g., lower transmit power or increase data transfer rate, and the remote unit benefits from the improved performance.

There are many ways to estimate a non-spatial processing performance level during spatial processing operations. For example, the remote unit 100 can calculate an average performance gain from spatial processing, measure the current performance level during spatial processing operations, and subtract the calculated gain from the measured performance level to derive an estimated performance level for non-spatial processing operations. This implementation and others are further described below with reference to FIGS. 8-10.

When the base station's response to a reported spatial processing gain benefits the remote unit, the feedback adjustment unit, in one embodiment, adjusts feedback so that the base station does adjust operating parameters. For example, when the remote unit is communicating with a base station that is using feedback from the remote unit for determining the maximum data rate sustainable to the remote unit, the feedback adjustment unit provides feedback indicating that the remote unit is taking full advantage of the spatial processing gain so that the base station correctly concludes that a high data rate can be maintained to the remote unit and, furthermore, maintains such a data rate. Consequently, the remote unit is advantageously able to benefit from the performance gained from spatial processing.

A Receive Path

Figure 2A:
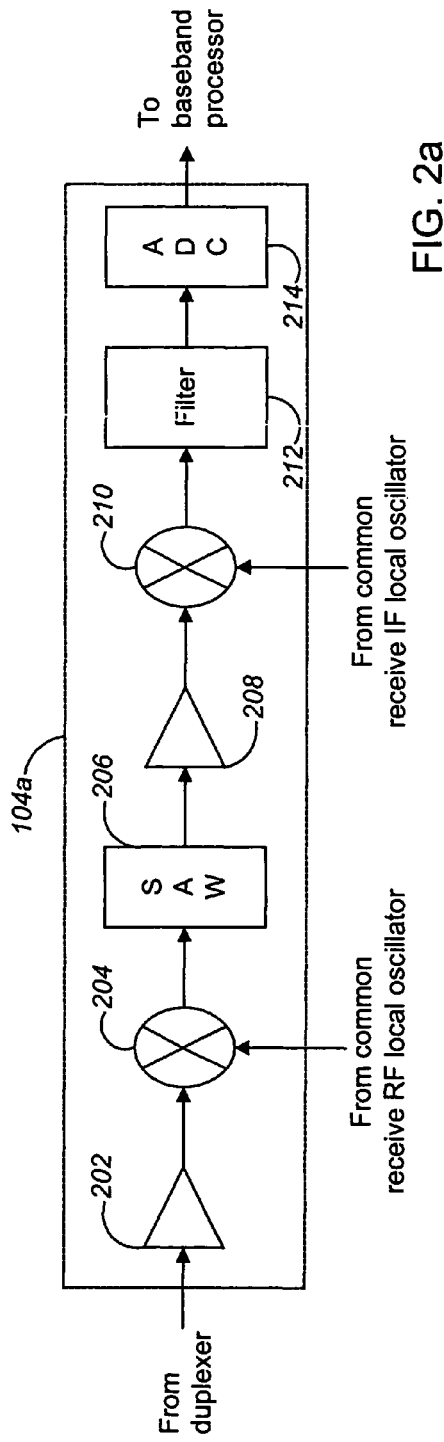
FIG. 2A shows a receive path of the remote unit of FIG. 1.

FIG. 2A shows the receive path 104a and the devices therein. As shown, the receive path 104a includes a low noise amplifier 202, mixers 204 and 210, a surface acoustic wave filter 206, an amplifier 208, a filter 212, and an analog to digital converter 214. The receive path 104a shares external local oscillators with receive path 104b (net shown in FIG. 2A). In operation, the antenna 102a receives a signal which the duplexer 109 routes to the receive path 104a. The devices in the receive path 104a prepare the signal for processing in a baseband processor, such as baseband processor 105. Receive path 104b is similar to receive path 104a.

A Transmit Path

Figure 2B:
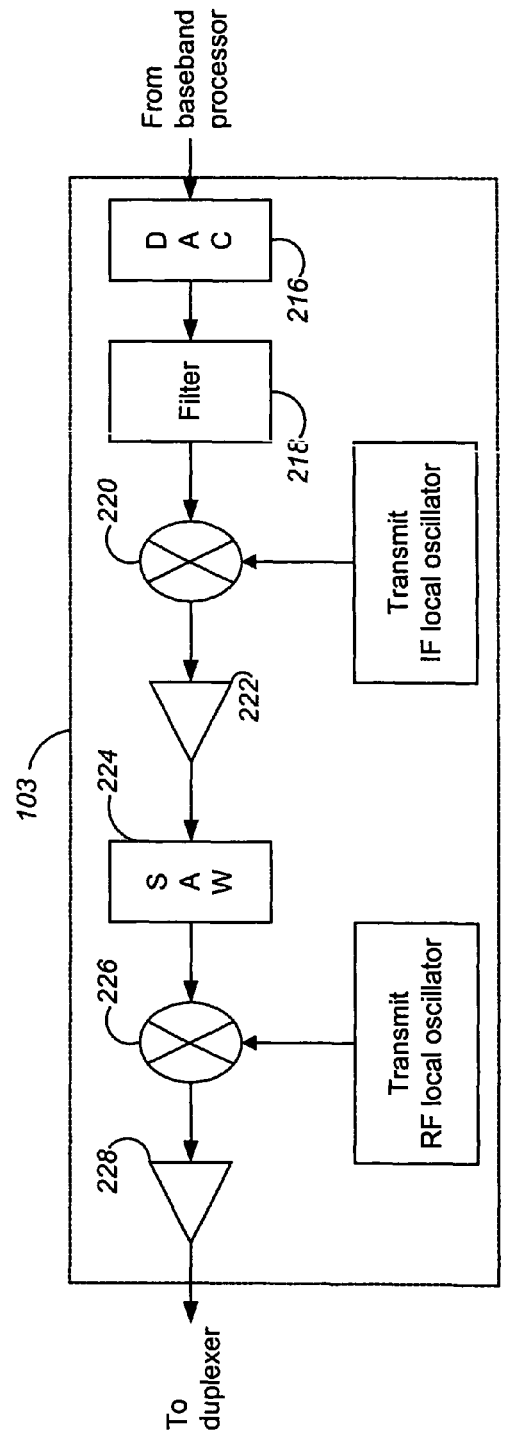
FIG. 2B shows a transmit path of the remote unit of FIG. 1.

FIG. 2B shows the transmit path 103 and the devices therein. As shown, the transmit path 103 includes a digital to analog converter 216, a filter 218, mixers 220 and 226, an amplifier 222, a surface acoustic filter 224, and a power amplifier 228. Unlike the receive paths 104a and 104b which use external local oscillators, the transmit path 103 has internal local oscillators. In other embodiments, the receive and transmit paths can share local oscillators. In operation, the transmit modulator 115 (FIG. 1) sends a signal to be transmitted to the transmit path 103 which prepares the signal for transmission. The duplexer 109 (FIG. 1) routes the signal to be transmitted to the antenna 102a. The receive and transmit paths described are illustrative and, accordingly, other implementations of transmit and receive paths can be used, for example, quadratures or direct conversion architectures.

Methods for Conserving Power

FIG. 3 shows a flow diagram of a method for conserving power in a spatial processing remote unit, such as remote unit 100, in accordance with one embodiment of the invention. As shown, the remote unit periodically enables all receive paths (step 302). While all receive paths are enabled, the remote unit determines a current performance level (step 304) and compares the current level to that measured immediately before all the receive paths were enabled. This comparison yields a performance gain. The remote unit evaluates whether the gain warrants the additional power consumed by the additional antennas and antenna paths (step 306). The evaluation is based on the performance gained versus the power consumed by enabling additional receive paths. The remote unit then uses the evaluation to selectively disable receive paths (step 308).

FIG. 4 shows a flow diagram of a method for conserving power in a spatial processing remote unit, such as remote unit 100, in accordance with one embodiment of the invention. The remote unit determines the type of service being requested (step 402). As discussed, the type of service includes voice services and data services. Voice services involve voice communications directly or indirectly and between or among individuals and typically include establishing and maintaining calls through a PSTN or a packet based network. Data services involve the transfer of data, digital or analog, and include sending and receiving facsimiles and searching and retrieving of data from information stores such as the Internet. Requested services typically have different data transfer rates with data services usually requiring faster data transfer rates than do voice services.

In one embodiment, the remote unit enables a predetermined number of receive paths corresponding to the type of service requested (step 404). Usually, more receive paths are needed for requested services requiring high data rates. For example, in a remote unit, such as remote unit 100, that has two antennas, the predetermined number of enabled receive paths for data services is two and the predetermined number of enabled receive paths for voice services is one. In one implementation, new requested services, i.e., those available after the remote unit has been programmed, are characterized as being either voice or data type and are assigned a predetermined number receive paths according to their characterization. For example, a new data service is assigned a predetermined number of two receive paths and a new voice service is assigned a predetermined number of one receive path. Optionally, the number of predetermined receive paths to be enabled for a given requested service can be changed.

FIG. 5 shows a flow diagram of a method for conserving power in a spatial processing remote unit, such as remote unit 100, in accordance with one embodiment of the invention. As shown, the remote unit determines a performance level for the remote unit (step 502). In one embodiment, the remote unit determines a performance level from time to time. In other embodiments, determines are continuously derived, periodically derived, derived with a variable duty cycle, or derived using any combination of these methods. The remote unit then enables or disables receive paths in response to the estimated performance level. In one embodiment, the remote unit determines by measuring certain indicia of performance, examples of which include but are not limited to BER, FER, SINR, SNR, and RSSI. The remote unit selectively enables an additional receive path when the estimated performance level satisfies a first set of conditions (step 504). As an example, the first set of conditions can include a condition that BER exceeds a threshold BER and a condition that another receive path is available for enabling. The remote unit selectively disables an enabled receive path when the estimated performance level satisfies a second set of conditions (step 506). As an example, the second set of conditions can include a condition that BER is less than or equal to the threshold BER and a condition that more than one receive path is currently enabled.

Figure 6:
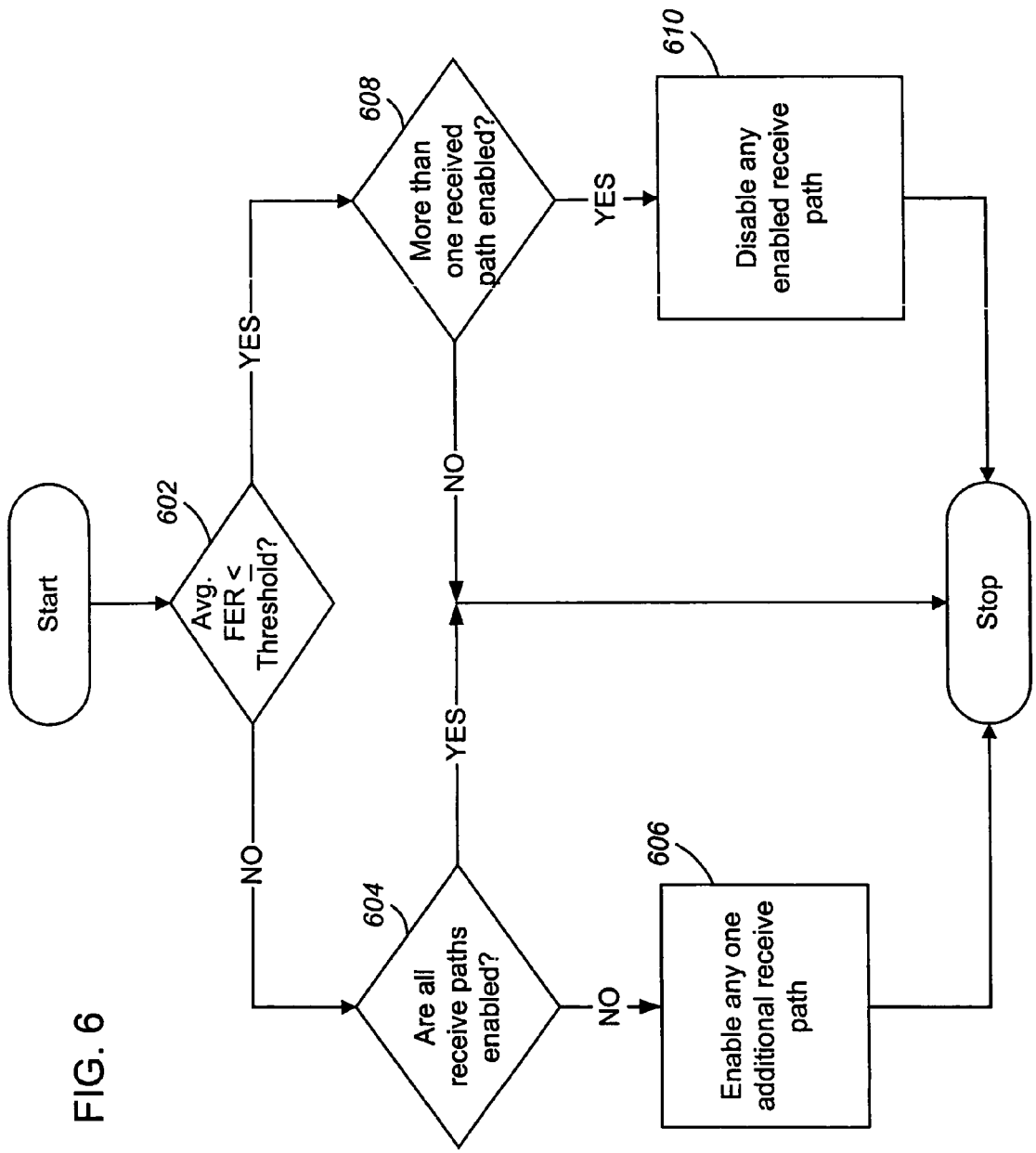
FIG. 6 shows a flow diagram of a method for determining, during spatial processing operations, when to enable an additional antenna and when to disable an enabled antenna, in accordance with one embodiment of the invention.

FIG. 6 is a flow diagram for determining, during spatial processing operations, when to enable an additional receive path (i.e., step 504 of FIG. 5) and when to disable an enabled receive path (i.e., step 506 of FIG. 5). As show in FIG. 6, a remote unit monitors and determines if the average FER is less than or equal to a first threshold (decision step 602). If the average FER is not, then the remote unit determines whether all receive paths are enabled (decision step 604). If not all receive paths are enabled, then the remote unit enables an additional receive path (step 606). If the average FER is less than or equal to the first threshold, then the remote unit determines whether there is more than one receive path enabled (step 608). If there is, then the remote unit disables an enabled receive path (step 610). Using logic implementing the flow shown in FIG. 6, the remote unit 100 in one embodiment dynamically and selectively enables and disables receive paths during spatial processing operations. In one implementation, the remote unit 100 enables and disables one receive path at a time. Alternatively, any individual or combination of indicia of performance, such as SINR, SNR, RSSI, or BER can be used in place of FER. Optionally, the remote unit 100 also measures the signal quality of each diversity branch of a received signal and disables the receive path with the diversity branch having the lowest signal quality.

Figure 7:
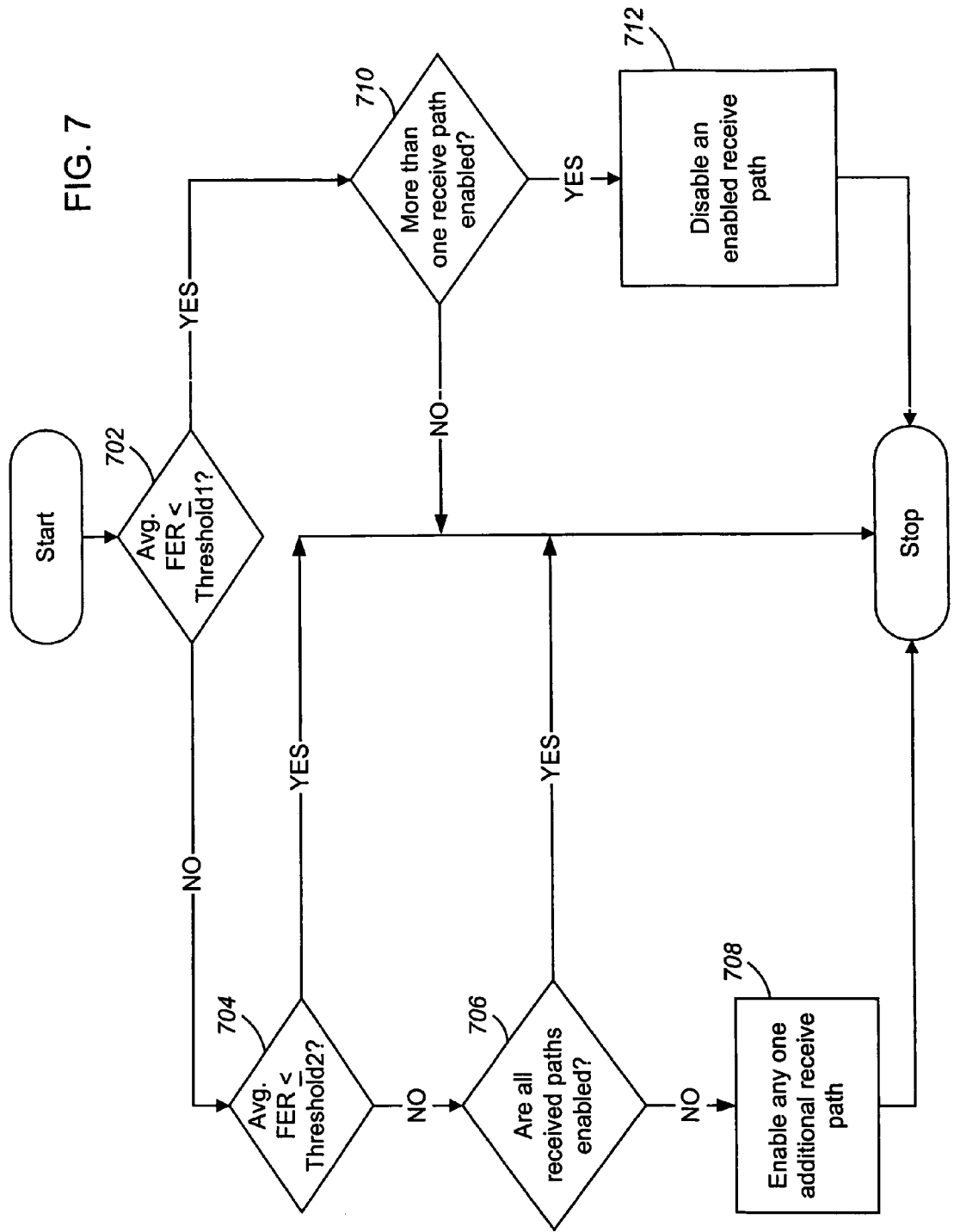
FIG. 7 shows a flow diagram of a method for determining, during spatial processing operations, when to enable an additional antenna and when to disable an enabled antenna, in accordance with one embodiment of the invention.

FIG. 7 is another flow diagram for determining, during spatial processing operations, when to enable an additional receive path (i.e., step 504 of FIG. 5) and when to disable an enabled receive path (i.e., step 506 of FIG. 5). As shown in FIG. 7, a remote unit determines if the average FER is less than or equal to a first threshold (decision step 702). If the average FER is not, then the remote unit determines if the average FER is less than or equal to a second threshold that is greater than the first threshold (decision step 704). If the average FER is not, then the remote unit determines whether all receive paths are enabled (decision step 706). If they are not all enabled, then the remote unit enables an additional receive path (step 708). Otherwise, the remote unit does not enable an additional receive path. If the average FER is less than or equal to a first threshold, then the remote unit determines whether more than one receive path are currently enabled (decision step 710). If there are more than one enabled receive path, then the remote unit disables an enabled receive path (step 712). Optionally, the remote unit also measures the quality of each version of a received signal and disables the receive path(s) with the lowest quality version.

Methods for Adjusting Feedback

In addition to having an onboard spatial processing unit for improving performance and a power conservation unit for conserving power during spatial processing operations, a remote unit in accordance with the invention also includes a feedback adjustment unit for allowing the remote unit to benefit from any performance level increase that the onboard spatial processing unit provides. As discussed above, the feedback adjustment unit 118 includes feedback adjustment logic for adjusting feedback that the remote unit transmits to a base station. Some illustrative feedback adjustment methods for increasing performance level are described below.

FIG. 8 shows a flow diagram of a method 800, in accordance with one embodiment of the invention, for adjusting feedback to allow a remote unit to benefit from spatial processing gains. As shown, during spatial processing operations, the remote unit periodically exits the spatial processing mode and temporarily operates in a non-spatial processing mode (step 802). The remote unit determines its performance level while in the non-spatial processing mode (step 804). The remote unit uses the determined performance level to adjust feedback so that the feedback represents the measured level of performance for the non-spatial processing mode (step 806). In one implementation, the remote unit operates in a non-spatial processing mode by disabling all but one receive path. Alternatively, the remote unit operates in a non-spatial processing mode by disabling one or both of the spatial processing unit and all but one receive path.

FIG. 9 shows a flow diagram of a method 900, in accordance with one embodiment of the invention, for adjusting feedback to allow a remote unit to benefit from spatial processing gains. The remote unit determines a performance gain that the spatial processing unit provides (step 902). The determined performance gain in one embodiment is the average performance gain during a given period of spatial processing operations. Alternatively, another method of determining performance gain can be used. The remote unit determines a performance level while operating in a spatial processing mode (step 904). The remote unit accounts for the determined gain and the determined performance level to determine an adjusted performance level associated with non-spatial processing operations (step 906). The remote unit uses the adjusted performance level to adjust feedback so that the feedback represents a level of performance associated with the non-spatial processing mode (step 908).

FIG. 10 shows a flow diagram of a method 1000, in accordance with another embodiment of the invention, for adjusting feedback to allow a remote unit to benefit from spatial processing gains. The remote unit determines the type of service being requested (step 1002). The types of service are similar to those discussed above. The remote unit adjusts feedback by a predetermined amount that corresponds to the type of requested service (step 1004). In one implementation, the predetermined amount is zero for voice services and, for data services, is an amount corresponding to the average spatial processing gain: Alternatively, the predetermined amount is proportional to the data transfer rate to satisfactorily support the type of requested service. That is, a requested service that should use a high data transfer rate results in a feedback to the base station that does not reflect the gain that the onboard spatial processing unit provides. In this last case, the predetermined amount is limited so that the feedback does not indicate a performance level that is below a particular wireless system's operating parameters, system architecture, or standard. In response to the adjusted feedback, a base station receiving the feedback does not lower transmit power when the remote unit's performance level improves. Consequently, the remote unit benefits from performance gained from the onboard spatial processing unit.

It will be appreciated form the foregoing that the invention, including the described methods and logic, can be implemented in digital electronic circuitry, or in computer hardware, firmware, software, or in combinations of them. In one embodiment, the invention is implemented at least in part in digital electronic circuitry, including but not limited to application specific integrated circuits ("ASIC"). Similarly, in another embodiment, the inventions is implemented at least in part in digital electronic circuitry, including but not limited to field-programmable gated arrays ("FPGA"). Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors.

The invention has been described in terms of particular embodiments. Other embodiments are within the scope of the following claims. For example, steps of the invention can be performed in a different order and still achieve desirable results.

What is claimed is:

1. A remote unit, comprising:
a plurality of antennas;
a spatial processing unit coupled to the plurality of antennas; a performance determination unit to determine a performance of the spatial processing unit;
a feedback adjustment unit to adjust feedback transmitted from the remote unit to a device so that the device does not adjust operating parameters in response to a performance gain attributable to the spatial processing unit,
wherein the feedback adjustment unit adjusts feedback to the device to exclude any performance gain attributable to the spatial processing unit.

2. The remote unit of claim 1, wherein: the feedback adjustment unit determines when to adjust feedback to the device not based on any performance gain attributable to the spatial processing unit but based on whether the remote unit is communicating with a device whose response to feedback indicating gain from spatial processing by the remote unit adversely affects the remote unit.

3. The remote unit of claim 1, wherein:
the feedback adjustment unit determines whether to include any performance gain attributable to the spatial processing unit in the feedback to the device, the determination being based on whether the remote unit is communicating with a base station whose response to feedback including any gain from spatial processing by the remote unit benefits the remote unit.

4. The remote unit of claim 1, wherein:
the remote unit operates in a non-spatial processing mode; and
the performance determination unit determines a performance level of the remote unit while the remote unit is operating in the non-spatial processing mode.

5. The remote unit of claim 1, wherein:
the spatial processing unit calculates and provides to the performance determination unit a performance gain provided by spatial processing; and
the performance determination unit measures a performance level of the remote unit when operating in a spatial processing mode and excludes the performance gain from the measured performance level.

6. The remote unit of claim 1, wherein the remote unit supports one or more types of requested service, and wherein the feedback adjustment unit includes logic for specifying when to adjust feedback depending on the type of requested service.

7. The remote unit of claim 1, further comprising:
a user interface coupled to the feedback adjustment unit for receiving user input for adjusting feedback.

8. The remote unit of claim 7, wherein user input includes selecting from a group consisting of:
always adjust feedback;
never adjust feedback; and
selectively adjust feedback based on control parameters.

9. The remote unit of claim 1, wherein a subset of the plurality of antennas have different characteristics relative to one another.

10. The remote unit of claim 9, wherein the different characteristics are caused by antennas in the subset being physically separated relative to each other.

11. The remote unit of claim 9, wherein the different antenna characteristics is caused by each of the subset having different orientations.

12. The remote unit of claim 11, wherein the different characteristics are caused by each of the antennas of the subset having substantially orthogonal orientations relative to one another.

13. The remote unit of claim 9, wherein the different characteristics are caused by each of the antennas of the subset having a different material composition.

14. The remote unit of claim 9, wherein the different characteristics are caused by each of the antennas of the subset having different shapes.

15. A handset comprising:
a plurality of antennas;
a spatial processing unit coupled to the plurality of antennas;
a performance determination unit to estimate a performance benefit of the spatial processing unit; and
a feedback adjustment unit to compute an adjusted feedback to be transmitted from the handset to a base station, wherein the adjusted feedback excludes the estimated performance benefit of the spatial processing unit.

* * * * *